(12) United States Patent
Fitzgerald et al.

(10) Patent No.: US 6,311,257 B1
(45) Date of Patent: Oct. 30, 2001

(54) METHOD AND SYSTEM FOR ALLOCATING MEMORY FOR A COMMAND QUEUE

(75) Inventors: John T. Fitzgerald, Mansfield; Erez Ofer, Brookline; Kenneth Halligan, Leominster, all of MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/290,844

(22) Filed: Apr. 13, 1999

(51) Int. Cl.[7] ............................................. G06F 3/00
(52) U.S. Cl. ........................... 711/170; 711/111; 711/112; 711/147; 711/148; 711/153; 711/171; 711/172; 711/173; 710/1; 710/36; 710/39
(58) Field of Search .................... 711/111–114, 147–153, 711/170–173; 710/36, 39, 1

(56) References Cited

U.S. PATENT DOCUMENTS

| | | | |
|---|---|---|---|
| 5,561,785 | * 10/1996 | Blandy et al. | ...................... 711/170 |
| 5,651,111 | * 7/1997 | McKeeman et al. | .................. 714/38 |
| 5,796,413 | * 8/1998 | Shipp et al. | .......................... 345/522 |
| 6,000,011 | * 12/1999 | Freerksen et al. | .................... 711/118 |
| 6,141,707 | * 10/2000 | Halligan et al. | ....................... 710/36 |

* cited by examiner

*Primary Examiner*—Than Nguyen
(74) *Attorney, Agent, or Firm*—Fish & Richardson P.C.

(57) ABSTRACT

A method and data storage system using the method, provides an efficiently approach for allocating a static amount of buffer space (e.g., records) among a number of logical volumes of a data storage system on the basis of the computing environment within which the data storage system is used. The method includes providing the data storage system from logical volumes, each including a command queue. Each command queue includes records, each for storing a command request. A memory pool is established from which one or more records can be allocated to each command queue associated with each logical volume. The memory pool has a predetermined number of records which can be allocated by the command queues of the logical volumes. Based on the computing environment, one of a number of allocation schemes for allocating records to a command queue is selected.

21 Claims, 4 Drawing Sheets

METHOD AND SYSTEM FOR ALLOCATING MEMORY FOR A COMMAND QUEUE

BACKGROUND OF THE INVENTION

The invention relates generally to methods and apparatus for improving the performance of a mass storage system.

Disk drive systems have grown enormously in both size and sophistication in recent years. These systems can typically include many large disk drive units controlled by a complex, multi-tasking, disk drive controller such as the EMC Symmetrix disk drive controller (a product of EMC Corporation, Hopkinton, Mass.). A large scale disk drive system can typically receive commands from a number of host computers and can control a number of disk drive mass storage devices, each mass storage device capable of storing in excess of several gigabytes of data. Each mass storage device can be representative of one or more logical volumes. Alternatively, a physical disk drive element may represent several of the logical volumes. The EMC Symmetrix data storage system is configured to include as many 4096 logical volumes.

Each logical volume has an associated command queue for receiving input/output command requests from one or more hosts connected to the disk drive system. A "queue", in general, is nothing more than a multi-element data structure from which elements (e.g., command requests) can be removed in the same order in which they were inserted; that is, the queue follows a first-in-first-out (FIFO) constraint. Thus, input/output command requests are typically received in the command queue and executed in the order in which they are received. A command queue typically has a finite maximum length (i.e., predetermined number of records) so that when the queue is full, a host is not able to make a command request until a previously stored command request has been transferred and executed. Hosts of different types respond differently to a "queue full" message. For example, one type of host will simply wait and periodically poll the particular logical volume with its request. Another type of host, upon receiving a "queue full" message will change its mode of operation, for example, to limit the number of requests made in a give period of time. To return to its original mode of operation may require resetting the host (e.g., reboot).

SUMMARY OF THE INVENTION

The invention features a method, as well as a data storage system using the method, for efficiently allocating a static amount of buffer space (e.g., records) among a number of logical volumes of a data storage system on the basis of the computing environment within which the data storage system is used. By "computing environment" it is meant the number, type (i.e., manufacturer, model), and characteristics (e.g., communication protocol) of hosts connected to the data storage system.

In a general aspect of the invention, the method for providing input/output allocation between a number of hosts and a data storage system in a computing environment includes the following steps. The data storage system is provided from a plurality of logical volumes, each of the logical volumes including a command queue. Each command queue includes records, each for storing a command request. A memory pool is established from which records can be allocated to each command queue associated with each logical volume. The memory pool has a predetermined number of records which can be allocated by the command queues of the logical volumes. Based on the computing environment, one of a number of allocation schemes for allocating records to a command queue of a logical volume is selected.

Allocating records to command queues on the basis of the computing environment has numerous advantages, particularly for enterprise data storage systems which interface with different types of hosts. In general, the method reduces the possibility that any of a number of hosts connected to the data storage system will receive a "queue full" message from the storage system. The method recognizes that hosts of different types generally behave differently when communicating with a data storage system and their tolerance to changes may be different. For example, one type of host may be configured to operate with a data storage system in which certain data objects (e.g., stack or queue) and their size are predefined. Changing the size of these data objects may cause problems during communication between the storage system and host. On the other hand, a host of a different type may be less sensitive to such changes. The method allows each of the different hosts to be connected to and simultaneously use the data storage system by selecting the most efficient and effective allocation scheme that the host is able to use.

Embodiments of this aspect of the invention may include one or more of the following steps. Selecting one of the allocation schemes includes determining the type of hosts connected to the data storage system, for example, whether the host can tolerate a variable-length command queue.

If the host cannot tolerate a variable-length command queue, a strict allocation scheme is generally preferred. The strict allocation scheme includes determining the number of logical devices in the data storage system, and then determining the number of records for each command queue by dividing the predetermined number of records associated with the memory pool by the total number of logical devices. Using the strict allocation scheme is preferably used if all of the hosts connected to the data storage system cannot tolerate a variable-length command queue. In this case, the method recognizes that the most effective way of allocating records from the memory pool is to divide them evenly among the command queues of each logical volume.

If all of the hosts can tolerate a variable-length command queue, a no-maximum allocation scheme may be preferable. In this scheme, each logical volume can add as many records as there are available from the memory pool.

In applications where one host connected to the data storage system can tolerate a variable-length command queue, and another host connected to the storage system cannot, a pseudo-maximum allocation scheme can be used. The pseudo-maximum allocation scheme includes determining the number of logical devices in the data storage system, and then determining a maximum number of records which can be added to a logical volume, the maximum number being greater than the predetermined number of records associated with the memory pool divided by the number of logical devices. Thus, the method recognizes that at any given point of time, the total number of command requests sent by all of the hosts will almost always be less than the total number of available queue records.

The command queues for each logical volume are configured as free list data structures and allocating records to a command queue is performed one record at a time.

In another aspect of the invention, a data storage system includes a controller which implements the method approach described above.

Other advantages and features of the invention will be apparent from the following description and from the claims.

BRIEF DESCRIPTION OF THE INVENTION

DETAILED DESCRIPTION

Figure 1:
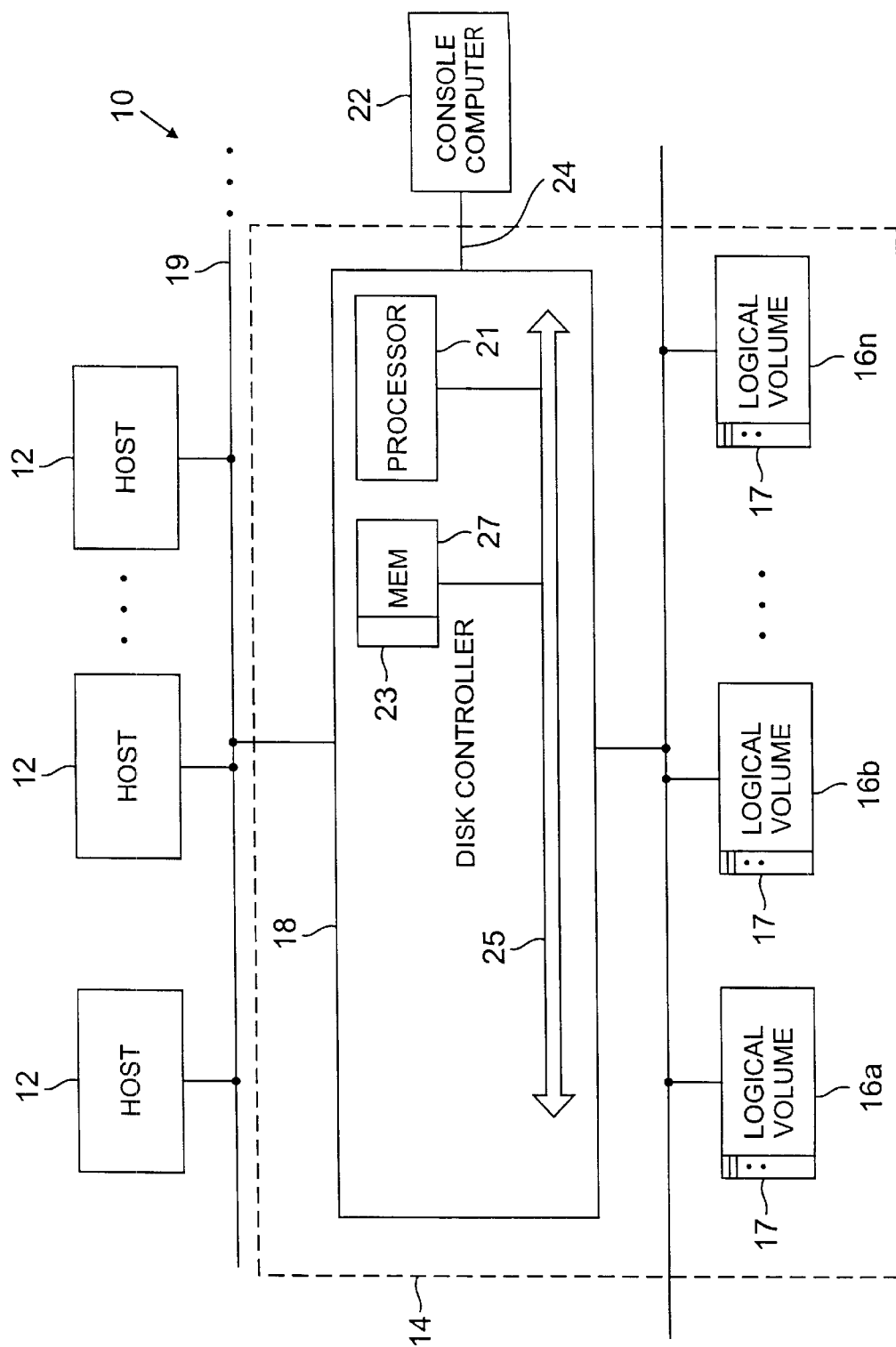
FIG. 1 is a block diagram illustrating the disk storage element/host computer system with which the invention is particularly useful.

Referring to FIG. 1, a computer system 10 includes at least one, and more likely several host processors or computers (hosts) 12 connected to a mass storage system 14. In certain applications, hosts 12 may all be of the same type (i.e., same model and manufacturer). In many other applications, however, hosts 12 may be different. Thus, the manner in which each host communicates and its tolerance to changes of its protocol may differ.

Mass storage system 14 includes a number of logical volumes 16, each logical volume, for example, representative of one or more physical disk drive elements. Alternatively, a logical volume may represent a portion of a physical disk drive element with several of the logical volumes constituting a drive element. In this case, each physical drive has a number of logical volumes, for example, four, eight, or more logical volumes in a single physical disk drive element. Each of logical volumes 16 typically represents a relatively large amount of memory (e.g., 1 gigabyte or more). Logical volumes 16 together, in aggregate, define a large mass storage device having a memory capacity equal to the sum of each of the logical volumes.

Figure 2:
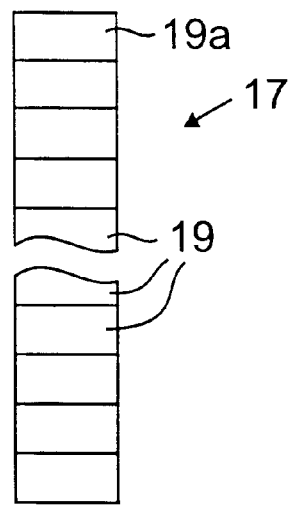
FIG. 2 is a functional representation of a command queue associated with one of the logical volumes of the disk storage system of FIG. 1.

Referring to FIG. 2, each logical volume 16 includes a corresponding command queue 17. Command queues 17 represent ordered lists, each of which receives command requests sent from hosts 12 and stores the requests in records 19. Additions to command queues 17 take place at the rear of the queue while deletions take place at the front of the queue. Thus, a request stored within the record 19a at the front of the queue is the next one to be executed. Hosts 12 can send a large number of command requests which can accumulate within a command queue 17 faster than they are executed. Thus, the records in the command queue can be occupied until there are no records remaining in the queue to store newly received command requests. In this case, a "Queue Full" message is received by the host sending the command request requiring the host to re-submit the command request at a time when a record in the command queue has been freed.

Referring again to FIG. 1, storage system 14 includes a disk drive controller 18 (e.g., that which is manufactured by EMC Corporation, Hopkinton, Mass.) interconnects host computers 12 and logical volumes 16. Disk controller 18 receives memory commands, for example, read and write commands from host computers 12 over a bus 19 operating in accordance with a SCSI protocol. Disk controller 18 includes a processor 21 for executing computer instructions associated with the operation described below. The computer instructions are stored in a memory 23 connected to processor 21 via an internal bus 25. Disk controller 18 delivers data associated with those commands to or from an appropriate one of logical volumes 16 over a second bus 20 which, for example, also operates in accordance with a SCSI protocol.

In a typical configuration, controller 18 is also connected to a console computer 22 through a connecting bus 24. Console computer 22 is used for maintenance and access to controller 18 and can be employed to set parameters of and/or to initiate maintenance commands to the controller, under user control, as is well known in the art.

As will be described in greater detail below, disk controller 18, on the basis of the computing environment for which the storage system is being used (i.e., type and characteristics of hosts), allows each of logical volumes 16 to increase or decrease the number of records in their respective command queues 17 from a memory pool 23 within memory 27. For example, if a particular host 12 is tolerant in using a logical volume 16 having a command queue of varying size, disk controller 18 will select an allocation scheme which will allow the command queue to acquire a larger number of records. Generally, in this case, disk controller 18 will allow the command queue to acquire an additional record from memory pool 23. When the command requests stored in that record is executed, disk controller 18 allows the record to be de-allocated or returned to memory pool 23 for use by that host or another host which requires it. On the other hand, if the host is of the type which expects to use a logical volume of a fixed size, disk controller scheme will ensure that the command queue associated with that host remains unchanged.

Each command request received by disk controller 18 generally includes information relating to 1) which particular host sent the request; 2) what path was used to receive the request; and 3) the type of host. Disk controller 18 uses this information to determine which allocation scheme will be used for a given task.

Memory pool 23 includes a fixed number of records which are allocated by disk controller 18 among all of logical volumes 16. For example, memory pool may include a total of 2048 (800 H) records which are shared by all of the logical volumes.

Depending on the host making a command request and its particular characteristics, disk controller 18 selects one of three different allocation schemes for the command queue of the logical volume associated with the request. The allocation schemes will now be described.

Fixed or Strict Allocation

With this approach, the total number (n) of available queue records is evenly divided among the number (m) of logical volumes. Thus each logical volume is allocated with (n/m) records. For purposes of example, if there are 2048 (800 H) available queue records and 256 logical volumes, each logical volume will be assigned eight records. Disk controller 18 will typically use this allocation scheme when all of the hosts are of the type which are configured to expect a pre-established number of records for the command queue. Such hosts keep track of the number of command requests made to a logical volume and already know that the command queue is full and will automatically wait for an indication that a command request has been executed and a record has been freed. This strict allocation approach is also used by disk controller 18 as the default selection when the disk controller is not sure of the type or characteristics of the hosts in the computing environment.

Pseudo-Maximum Allocation

The Pseudo-Maximum allocation scheme is generally used when hosts of various types are connected to mass storage system 14. In particular, the scheme is best suited for those arrangements in which there are hosts that are tolerant of a variable size command queue and hosts that are not. This approach allows the command queue for each logical volume to be assigned a number of records (r), the sum of the records for all of the command queues being greater than the total number of available queue records (n) in memory pool 23. The scheme is based on the recognition that at any given point of time, the total number of command requests (the sum of all r's) sent by the hosts will almost always be less than the total number of available queue records (n). In many cases, a command queue associated with a particular logical volume may require a large number of records while, at the same time, another command queue associated with a different logical volume will require a far fewer number of records. In the rare circumstance that the total number of allocated records exceeds that which are available in memory pool 23, disk controller 18 simply informs the particular host making a request that the queue is full. Because the host is of the type tolerant of being told that the queue is full, it can simply re-submit its requests after a predetermined time.

No Maximum Allocation

The No-Maximum allocation scheme is used when all of the hosts are tolerant of a variable size command queue. In this case, each host can freely allocate further records from memory pool 23 as needed. As was the case, in the Pseudo-Maximum approach, if memory pool 23 is depleted, the requesting host simply issues a message to the host indicating that the particular command queue is full.

Figure 3A:
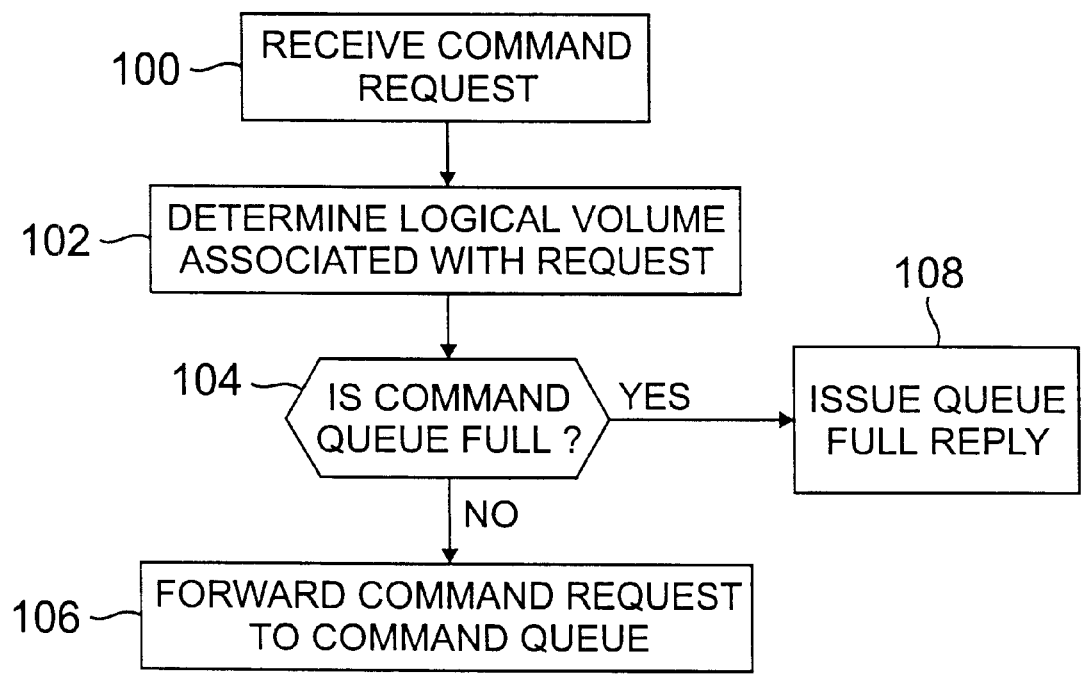
FIGS. 3A–3C are flow charts illustrating operation of the system in accordance with strict, no-maximum, and pseudo-maximum allocation schemes.
Figure 3B:
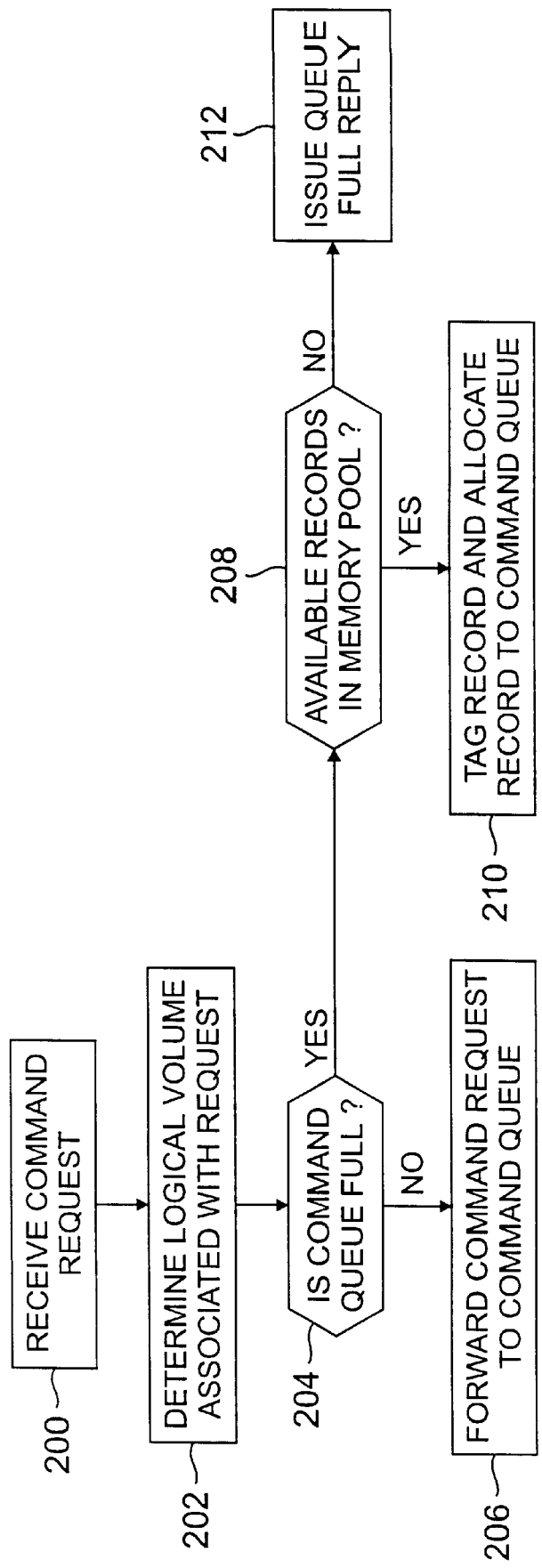
Figure 3C:
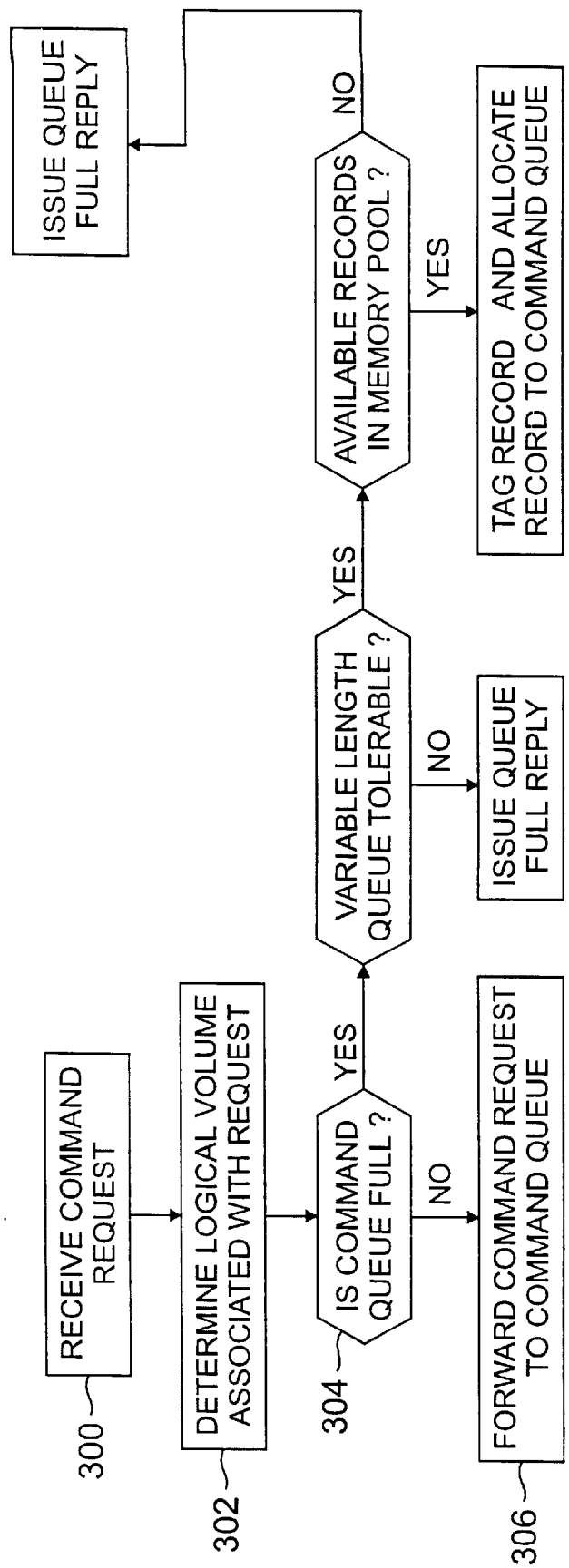

Referring to FIGS. 3A–3C, flowcharts representing the operation of disk controller 18 for the Strict, Pseudo-Maximum, and No-Maximum allocation schemes are shown, respectively.

Referring to FIG. 3A, for the strict allocation approach, when a command request is received (100) from a host 12, via bus 19, disk controller 18 determines which logical volume 16 the request is associated with (102) and whether the command queue associated with that logical volume is full (104). If the command queue is not full, disk controller 18 simply forwards the command request where it is buffered within the command queue (106). If the command queue is full, disk controller 18 issues a "Queue Full" message to the host sending the command request so that the host can re-submit the command request at a time when a record in the command queue has been freed (108).

Referring to FIG. 3B, for the No-Maximum allocation approach, when a command request is received (200) from a host 12, via bus 19, disk controller 18 determines which logical volume 16 the request is associated with (202) and whether the command queue associated with that logical volume is full (204). If the command queue is not full, disk controller simply forwards the command request where it is buffered within the command queue (206). If the command queue is full, disk controller 18 determines whether there are available records in memory pool 23 which can be allocated to the command queue (208). If available queue records are available, disk controller 18 tags the record to indicate which logical volume is using the record and that it is no longer available for use, until de-allocated (210). Disk controller 18 then allocates a record to the command queue. If available queue records are not available from memory pool 23, disk controller issues a "Queue Full" message to the host which sent the command request so that the host can re-submit the command request at a time when a record in the command queue has been freed (214).

Referring to FIG. 3C, for the Pseudo-Maximum allocation approach, when a command request is received (300) from a host 12 via bus 19, disk controller 18 determines which logical volume 16 the request is associated with (302) and whether the command queue associated with that logical volume is full (304). If the command queue is not full, disk controller simply forwards the command request where it is buffered within the command queue (306). If the command queue is full, disk controller 18 determines whether the requesting host is one that can tolerate a variable length command queue (308). If the host cannot, disk controller 18 issues a "Queue Full" message to the host sending the command request so that the host can re-submit the command request at a time when a record in the command queue has been freed (310). On the other hand, if the host can tolerate a variable length command queue, disk controller 18 determines whether there are available records in memory pool 23 which can be allocated to the command queue (312). If available queue records are available, disk controller 18 tags the record to indicate which logical volume is using the record and that it is no longer available for use, until de-allocated (314). Disk controller 18 then allocates a record to the command queue (316). If available queue records are not available from memory pool 23, disk controller issues the "Queue Full" message to the host, which sent the command request (318).

Other embodiments are within the scope of the claims. For example, in the approach described above, records are allocated to a command queue one record at a time. In this way, each command queue only has as many records as it currently needs at any given time.

Additions, subtractions, and other modifications of the disclosed preferred particular embodiments of the invention will be apparent to those practicing the field and are within the scope of the following claims.

What is claimed is:

1. A method of providing input/output allocation between a plurality of hosts and a data storage system in a computing environment, the method comprising:

providing the data storage system from a plurality of logical volumes, each logical volume including a command queue for receiving command requests from the at least one host, each command queue including a plurality of records, each record for storing a command request;

establishing a memory pool from which records can be allocated to each command queue associated with each logical volume, the memory pool having a predetermined number of records which can be allocated by the command queues of the logical volumes; and selecting, based on the computing environment, one of a plurality of allocation schemes for allocating records to a command queue.

2. The method of claim 1 wherein, selecting one of the allocation schemes includes determining the type of hosts connected to the data storage system.

3. The method of claim 2 wherein, determining the type of hosts connected to the data storage system includes determining whether the host can tolerate a variable-length command queue.

4. The method of claim 3 wherein, if the host cannot tolerate a variable-length command queue, using a strict allocation scheme including:

determining the number of logical devices in the data storage system; and determining the number of records for each command queue by dividing the predetermined number of records associated with the memory pool by the total number of logical devices.

5. The method of claim 4 further comprising using the strict allocation scheme if all of the hosts connected to the data storage system cannot tolerate a variable-length command queue.

6. The method of claim 2 wherein, if the host can tolerate a variable-length command queue, using a pseudo-maximum allocation scheme including:
   determining the number of logical devices in the data storage system; and
   determining a maximum number of records which can be added to a logical volume, the maximum number greater than the predetermined number of records associated with the memory pool divided by the number of logical devices.

7. The method of claim 6 further comprising using the pseudo-maximum allocation scheme if the hosts connected to the data storage system include at least one host which can tolerate a variable-length command queue, and at least one host which cannot tolerate a variable-length command queue.

8. The method of claim 2 wherein, if the host can tolerate a variable-length command queue, using a no-maximum allocation scheme, wherein a maximum number of records which can be added to a logical volume is equal to the predetermined number of records in the memory pool.

9. The method of claim 2 wherein selecting one of the allocation schemes includes selecting from:
   a strict allocation scheme including:
      determining the number of logical devices in the data storage system; and
      determining the number of records for each command queue by dividing the predetermined number of records associated with the memory pool by the total number of logical devices;
   a pseudo-maximum allocation scheme including:
      determining the number of logical devices in the data storage system; and
      determining a maximum number of records which can be added to a logical volume, the maximum number greater than the predetermined number of records associated with the memory pool divided by the number of logical devices; and
   a no-maximum scheme wherein a maximum number of records which can be added to a logical volume is equal to the predetermined number of records in the memory pool.

10. The method of claim 1 wherein the command queues for each logical volume are configured as free list data structures.

11. The method of claim 1 wherein allocating records to a command queue is performed one record at a time.

12. The data storage system of claim 1 wherein the controller is configured to allocate records to a command queue one record at a time.

13. A data storage system of the type connected to a plurality of hosts, the data storage system, comprising;
   a plurality of logical volumes, each logical volume including a command queue for receiving command requests from the at least one host, each command queue including a plurality of records, each record for storing a command request;
   a memory pool from which records can be allocated to each command queue associated with each logical volume, the memory pool having a predetermined number of records which can be allocated by the command queues of the logical volumes; and
   a controller which selects one of a plurality of different allocation schemes, based on the computing environment, for allocating records to a command queue.

14. The data storage system of claim 13 wherein the controller is configured to determine the type of hosts connected to the data storage system.

15. The data storage system of claim 14 wherein the controller is configured to determine whether the host can tolerate a variable-length command queue.

16. The data storage system of claim 15 wherein the controller is configured to apply a strict allocation scheme, if the host cannot tolerate a variable-length command queue, the controller including:
   computer instructions which determine the number of logical devices in the data storage system; and
   computer instructions which determine the number of records for each command queue by dividing the predetermined number of records associated with the memory pool by the total number of logical devices.

17. The data storage system of claim 16 wherein the controller is configured to apply the strict allocation scheme if all of the hosts connected to the data storage system cannot tolerate a variable-length command queue.

18. The data storage system of claim 14 wherein, the controller is configured to apply a pseudo-maximum allocation scheme, if the host can tolerate a variable-length command queue, the controller including:
   computer instructions which determine the number of logical devices in the data storage system; and
   computer instructions which determine a maximum number of records which can be added to a logical volume, the maximum number greater than the predetermined number of records associated with the memory pool divided by the number of logical devices.

19. The data storage system of claim 18 wherein the controller is configured to apply the pseudo-maximum allocation scheme if the hosts connected to the data storage system include at least one host which can tolerate a variable-length command queue, and at least one host which cannot tolerate a variable-length command queue.

20. The data storage system of claim 14 wherein, if the controller determines that the host can tolerate a variable-length command queue, the controller is configured to apply a no-maximum allocation scheme using wherein a maximum number of records which can be added to a logical volume is equal to the predetermined number of records in the memory pool.

21. The data storage system of claim 13 wherein the command queues for each logical volume are configured as free list data structures.

* * * * *